(12) United States Patent
Marr et al.

(10) Patent No.: US 9,210,048 B1
(45) Date of Patent: *Dec. 8, 2015

(54) CLUSTERED DISPERSION OF RESOURCE USE IN SHARED COMPUTING ENVIRONMENTS

(75) Inventors: Michael David Marr, Monroe, WA (US); Tyson J. Lamoreaux, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 415 days.

This patent is subject to a terminal disclaimer.

(21) Appl. No.: 13/077,260

(22) Filed: Mar. 31, 2011

(51) Int. Cl.
*H04L 12/24* (2006.01)
*H04L 12/26* (2006.01)
*H04L 29/08* (2006.01)

(52) U.S. Cl.
CPC .......... *H04L 41/145* (2013.01); *H04L 43/0882* (2013.01)

(58) Field of Classification Search
CPC .............. H04L 41/145; H04L 43/0882; H04L 67/1019; H04L 67/1031
USPC ......................................................... 709/226
See application file for complete search history.

(56) References Cited

U.S. PATENT DOCUMENTS

| | | | |
|---|---|---|---|
| 6,862,623 B1 * | 3/2005 | Odhner et al. ................ 709/226 |
| 6,965,573 B1 | 11/2005 | Mizukoshi | |
| 7,127,492 B1 | 10/2006 | Calo et al. | |
| 7,200,530 B2 * | 4/2007 | Brown et al. ...................... 703/1 |
| 7,441,045 B2 * | 10/2008 | Skene et al. .................. 709/241 |
| 7,626,939 B1 * | 12/2009 | Vogel ............................. 370/252 |
| 8,037,127 B2 * | 10/2011 | Alstad ........................... 709/203 |
| 8,102,781 B2 | 1/2012 | Smith | |
| 8,125,985 B1 * | 2/2012 | Aybay et al. .................. 370/359 |
| 8,140,719 B2 * | 3/2012 | Lauterbach et al. ............ 710/36 |
| 8,250,574 B2 | 8/2012 | Baba | |
| 8,260,840 B1 | 9/2012 | Sirota et al. | |
| 2001/0052016 A1 | 12/2001 | Skene et al. | |
| 2003/0088660 A1 * | 5/2003 | Florman et al. ................ 709/223 |
| 2004/0205693 A1 * | 10/2004 | Alexander et al. ............ 717/100 |
| 2005/0169179 A1 * | 8/2005 | Antal et al. .................... 370/231 |
| 2005/0171927 A1 * | 8/2005 | Chan et al. ........................ 707/1 |
| 2005/0249220 A1 * | 11/2005 | Olsen et al. ................ 370/395.4 |
| 2006/0106922 A1 * | 5/2006 | Arregoces et al. ............ 709/223 |
| 2006/0143350 A1 * | 6/2006 | Miloushev et al. ........... 710/242 |
| 2006/0268843 A1 * | 11/2006 | Spitzer et al. ................. 370/352 |
| 2007/0233851 A1 | 10/2007 | Ma | |
| 2007/0276905 A1 * | 11/2007 | Durand et al. ................ 709/203 |
| 2008/0005349 A1 | 1/2008 | Li et al. | |

(Continued)

*Primary Examiner* — Joe Chacko
(74) *Attorney, Agent, or Firm* — Hogan Lovells US LLP (57) ABSTRACT

Host machines and other devices performing synchronized operations can be dispersed across multiple racks in a data center to provide additional buffer capacity and to reduce the likelihood of congestion. The level of dispersion can depend on factors such as the level of oversubscription, as it can be undesirable in a highly connected network to push excessive host traffic into the aggregation fabric. As oversubscription levels increase, the amount of dispersion can be reduced and two or more host machines can be clustered on a given rack, or otherwise connected through the same edge switch. By clustering a portion of the machines, some of the host traffic can be redirected by the respective edge switch without entering the aggregation fabric. When provisioning hosts for a customer, application, or synchronized operation, for example, the levels of clustering and dispersion can be balanced to minimize the likelihood for congestion throughout the network.

25 Claims, 6 Drawing Sheets

(56) References Cited

U.S. PATENT DOCUMENTS

| | | | |
|---|---|---|---|
| 2008/0155100 A1* | 6/2008 | Ahmed et al. | 709/226 |
| 2009/0276771 A1* | 11/2009 | Nickolov et al. | 717/177 |
| 2010/0027420 A1 | 2/2010 | Smith | |
| 2010/0254703 A1* | 10/2010 | Kirkpatrick et al. | 398/45 |
| 2010/0302940 A1* | 12/2010 | Patel et al. | 370/230 |
| 2011/0087799 A1* | 4/2011 | Padhye et al. | 709/235 |
| 2011/0145392 A1* | 6/2011 | Dawson et al. | 709/224 |
| 2011/0299402 A1 | 12/2011 | Vobbilisetty et al. | |
| 2011/0299534 A1* | 12/2011 | Koganti et al. | 370/392 |
| 2012/0030345 A1 | 2/2012 | Mahadevan et al. | |
| 2012/0226733 A1* | 9/2012 | Kim et al. | 709/201 |

* cited by examiner

CLUSTERED DISPERSION OF RESOURCE USE IN SHARED COMPUTING ENVIRONMENTS

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

In many instances, a customer will require more than one resource, such as a host machine, server, or other processing device, to perform portions of an operation. Since these operations typically require all the corresponding devices to communicate at substantially the same time, there can be resulting spikes in the network traffic that can lead to congestion events or otherwise slow down network communications. In certain cases, the network traffic can exceed the amount of buffer in one or more network switches, leading to dropped packets, device slowdown, and other such undesirable events. Many networks utilize large routers with significant buffer capacity to mitigate these events, but these routers are very expensive and come with significant upfront cost. When the network communication duty cycle for the operations is small, these very large buffers are only needed a small percentage of the time, and much of the expensive capacity is unutilized.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing network traffic in a data center, compute cloud, or other such electronic environment. In particular, the host machines, servers, or other such devices required to perform aspects of a common calculation or operation for a customer, application, or other such source (herein also known as a "workload") can be distributed, dispersed, and/or clustered according to the topology and capacity of the interconnect fabric between the computing devices (herein known as the "network fabric"). The network fabric itself is typically organized as hierarchical layers, where each layer contains a multiplicity of switching devices which route communication traffic between the host devices or layers of other switching devices. The choice of workload placement on the computing devices, and therefore of the degree of dispersion of the workload relative to the span of the network fabric, may be chosen to depend upon factors such as the subscription rate between layers of a network, number or diversity of workloads already provisioned on available computing devices, transmission bandwidth or latency or reliability requirements of the workload, buffering capacity of networking or computing devices, and other such factors. Workload bandwidth and latency requirements may be inferred from general assumptions about customer usage behavior or by measurement of historical usage either specifically by customer or in aggregate, or otherwise intended use may be specified directly by the customer through programmatic calls to an Application Programmer Interface (API) or other such management interface or configuration solution.

Such dispersion of workloads across computing devices can enable the hosting of High Performance Computing (HPC) clusters that communicate using conventional network protocols, such as the Internet Protocol (IP), within a shared data center environment. The communication can occur over any network topology or interconnect devices, including traditional Hierarchical Aggregation Pair networks using large/expensive routers or high radix aggregation fabrics (also known as Fat Tree, Constant Bisectional Bandwidth and Clos networks) using high-throughput commodity switches (i.e., inexpensive switches with small buffers relative to aggregate bandwidth). This workload placement strategy across host devices can be provided and/or utilized in any appropriate electronic environment, such as a cloud computing offering, as well as non-virtualized or otherwise private data center hosts using equivalent networking. Various embodiments described herein are particularly applicable to protocols found in the Internet Protocol suite or other protocol stacks that do not rely heavily on host-side buffering, although other protocols find use with various other embodiments.

Systems and methods in accordance with various embodiments can minimize the impact of synchronized intra-workload communication causing network congestion events by taking advantage of knowledge of network topology when placing workloads on hosts. Rather than clustering a given workload on computational hosts connected to a common switch, it can be advantageous in at least some embodiments to disperse the computation across computing hosts connected to several different switches. While distributing the hosts in this way increases the communication traffic in higher layers of the network and aggregate link traffic, there is also a corresponding increase in the aggregate buffering capability of the spanning network managing communications for that workload. Particularly when placed in a non-oversubscribed area of the network, there is, by definition, capacity to deal with all of the additional link traffic (since the higher layers of the network have as much capacity as the lower layers), and the additional buffering capability allows traffic bursts to be absorbed to a much greater degree, reducing the likelihood of congestion events. Thus, many cheap, commodity switches can be used to function like comparatively much more expensive, large routers by carefully managing placement within the fabric.

Conversely, total dispersion of the workload across host switches may not be desirable in all embodiments, such as where the network fabric is not non-blocking or otherwise has oversubscription between layers. When networking bandwidth is traditionally "oversubscribed" such as at the top of rack, for example, the network fabric can only route a fraction of the bandwidth generated by the host interfaces to higher layers. In such case, it can be desirable to place the workload on fewer host switches, such that the spanning tree of the workload minimizes the amount of link traffic in oversubscribed layers, for example by using hosts that are clustered on a small number of switches. The number of devices clustered on a given host switch, as well as a level of distribution of the hosts across multiple switches, thus can be determined based at least in part upon the level of oversubscription at each level in the network. A balance can be found between the number of same-switch connected hosts and the dispersion of hosts across other switches based on expected intra-cluster traffic and capabilities of the aggregation fabric to handle the load.

Other factors may affect workload placement decisions relative to the amount of dispersion or clustering across host devices. Like bandwidth, latency is also affected by the network topology which must be traversed in delivering the packet. When the packet traverses more layers of networking, it takes longer. Likewise, reliability of delivery may be impacted by the number of devices that must be traversed, particularly when devices in the route have a high likelihood of becoming congested and dropping packets, such as in a highly oversubscribed core router as often seen in Hierarchical Aggregation Pair topologies. Similarly, durability of the group of machines as a whole may factor into the choice of placement; greater dispersion increases the likelihood that some device participating in the computation will fail due to a single fault in the physical infrastructure (e.g., a rack level power failure), but minimizes the impact of that failure to fewer devices—this is sometimes known as minimizing the effective "blast radius". Finally, testing of the network fabric itself may influence placement decisions, where greater dispersion drives more traffic to higher layer devices which because of their non-proximity to the servers, make them challenging to test in a controlled way.

Systems and methods in accordance with various embodiments can minimize the impact of synchronized N×N communication patterns (where N refers to the number of nodes in a task cluster) common to HPC or other workloads using broadcast or multicast messaging or other high duty cycle peer-to-peer communication (herein also referred as "Dense P2P"). For network fabrics which do not support hardware-assisted message replication, broadcast and multicast traffic must be implemented through unicast messaging by iterating through each destination in sequence. Particularly when relying on software iterative unicast, Dense P2P is vulnerable to convoying behavior resulting in transmission latency proportional to the square of the number of peers (N) computing the workload. By using the techniques described herein as Random Next Iteration and/or Ordered Next Iteration, this convoying behavior can be minimized, resulting in transmission latencies proportional to the number of peers, which can be N-times faster. These techniques rely on carefully selecting which hosts communicate to minimize incast and other congestion events that are common in naïve software implementations of broadcast and multicast in network software stack substrates such as Message Passing Interface (MPI) or Internet Protocol (IP). Briefly, Random Next Iteration selects a random sequence for communicating with peers for each broadcast or multicast, while Ordered Next Iteration relies on an absolute ordering based on global host addresses (organized as a ring which wraps at the highest address to the lowest) and each host sends to the ring address in sequence starting with the next address greater than itself.

Figure 1:
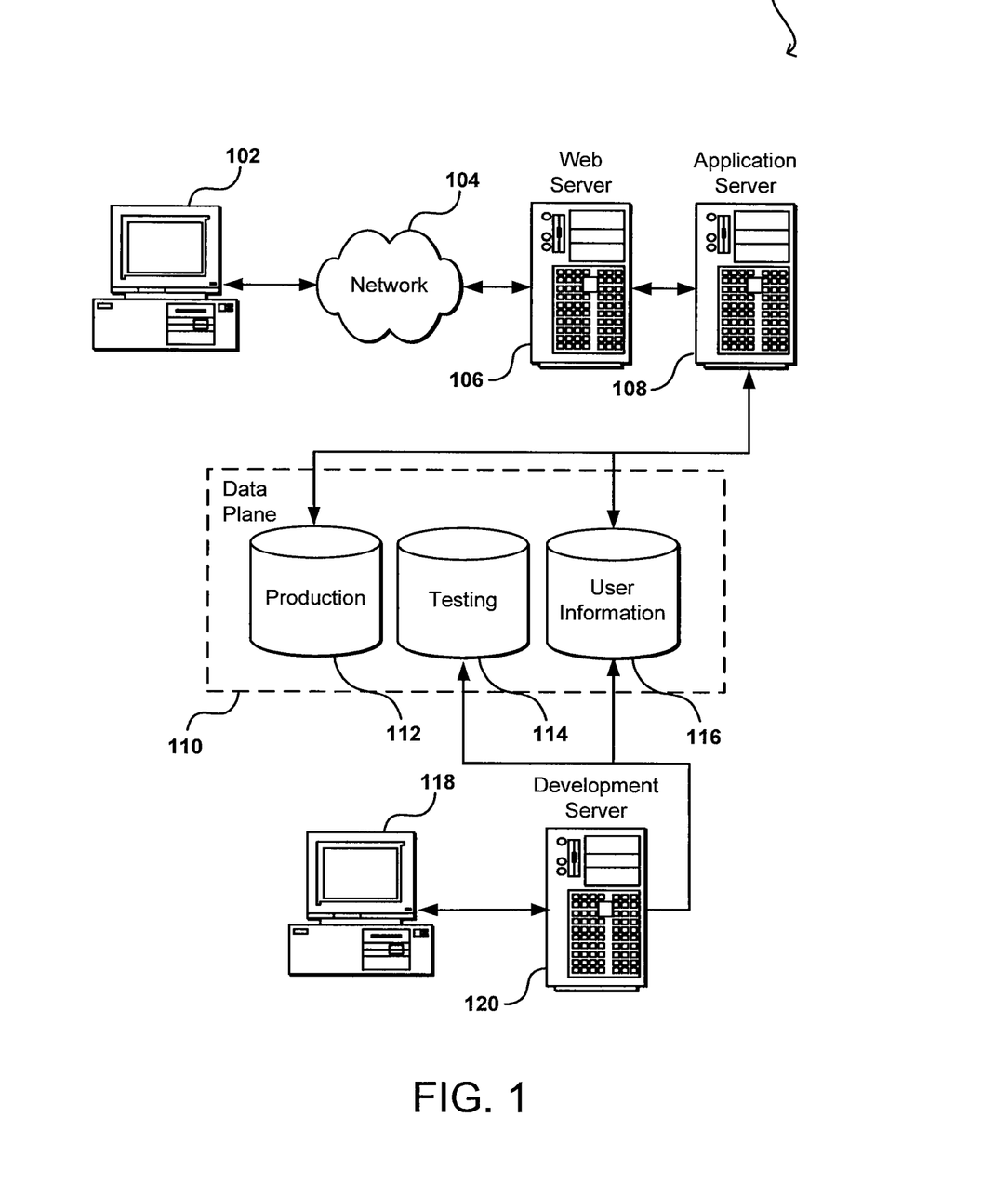
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include workstations, personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or computing device as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for an electronic marketplace or compute cloud, for example, wherein multiple hosts might be used to perform tasks such as serving content, executing large-scale computations, or performing any of a number of other such tasks. Some of these hosts may be configured to offer the same functionality, while other servers might be configured to perform at least some different functions. The hosts can be grouped together into clusters or other functional groups for the performance of specific tasks, such as may be provided as part of a data center, cloud computing offering, or processing service. The electronic environment in such cases might include additional components and/or other arrangements, such as those illustrated in the configuration 200 of FIG. 2, discussed in detail below.

Figure 2:
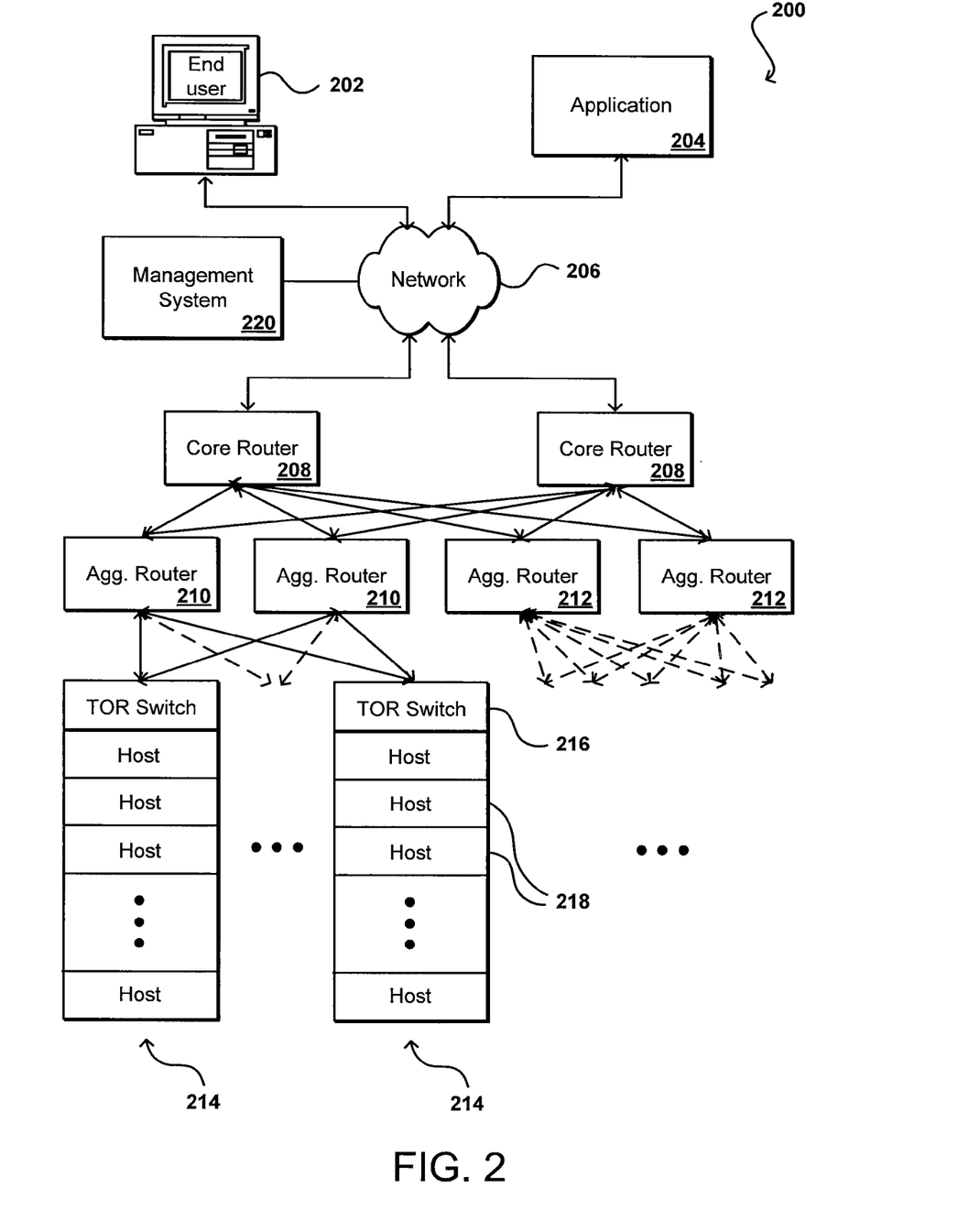
FIG. 2 illustrates an example of a highly connected network design that can be used in accordance with various embodiments.

For example, FIG. 2 illustrates an example configuration 200 that represents a traditional hierarchical network design that can be used to route requests to specific host machines or other such devices, in order to provide users or applications with access to a variety of distributed resources. This example shows a typical design that can be used for a data center, wherein a source such as an end user device 202 or application 204 is able to send requests across a network 206, such as the Internet, to be received by one or more components of the data center. Properties of various components of the network, such as provisioned instances, etc., can be managed using at least one management system, component, or service 220. In this example, the requests are received over the network to one of a plurality of core switches 208, but it should be understood that there can be any of a number of other components between the network and the core switches as known in the art. As traditional differentiators have substantially disappeared, the terms "switch" and "router" are often used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 208 is able to communicate with each of a plurality of aggregation switches 210, 212, which in at least some embodiments are utilized in pairs. Utilizing aggregation switches in pairs provides a redundant capability in case one or the switches experiences a failure or is otherwise unavailable, such that the other device can route traffic for the connected devices. Each pair of aggregation switches 210, 212 is linked to a plurality of physical racks 214, each of which typically contains a top of rack (TOR) or "access" switch 216 and a plurality of physical host machines 218, such as data servers and other processing devices. As shown, each aggregation switch can be connected to a number of different racks, each with a number of host machines. The links between the layers can each comprise redundant links, or link pairs, with separate links for inbound and outbound traffic. If the network utilizes redundant 1 Gigabit Ethernet (GbE) links, for example, the total bandwidth per redundant link is 2 GbE.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as 120 racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 206. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting thirty-six hosts in a physical rack, for example, each of three switches in the rack can act as a local TOR switch for a "logical" or "virtual" rack (a sub-rack of a physical rack or logical grouping of devices (hosts and/or switches) from multiple racks), with each local TOR switch connecting twelve of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each local TOR switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 3A:
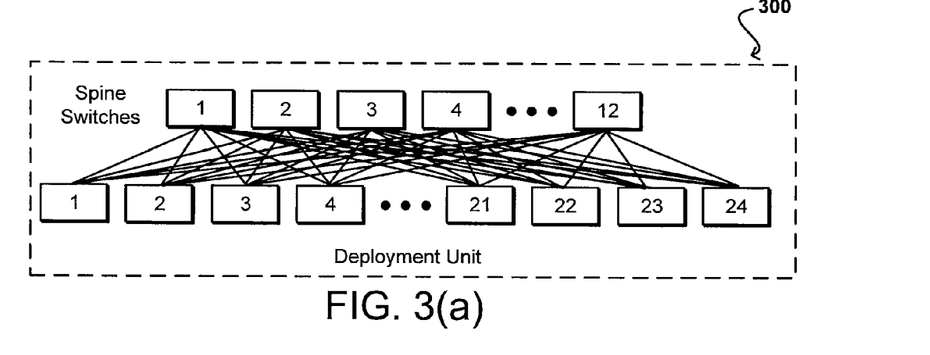
FIGS. 3(a) and 3(b) illustrate views of a Clos-network style deployment unit that can be utilized in accordance with various embodiments.
Figure 3B:
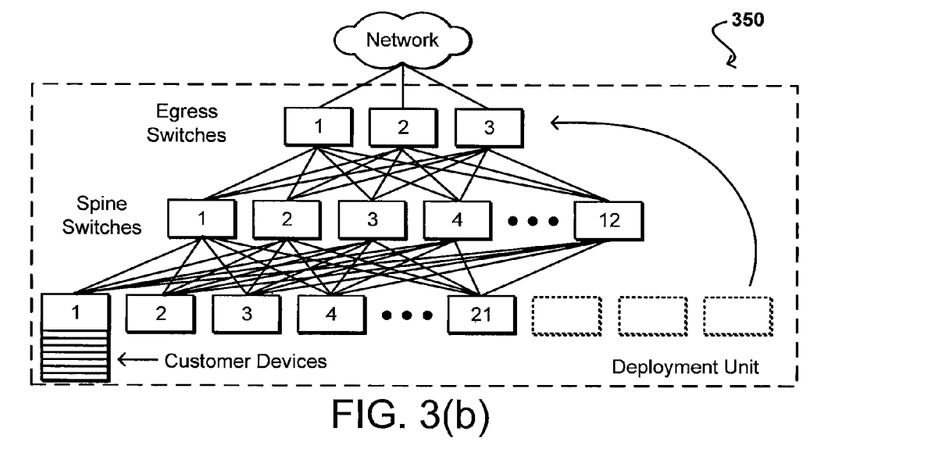

The connectivity approach used for such a network can vary between embodiments. For example, FIGS. 3(a) and 3(b) illustrate a design based on a Clos network approach, wherein there are twenty-one racks each with at least one TOR switch (actual or local), and each of the TOR switches is connected to an array of twelve spine switches, which typically will be located in another physical rack. The array of spine switches corresponds to a "center" stage in a traditional Clos network design. Since there are twelve hosts, there are twelve "up" connections and twelve "down" connections to the spine switches. The design thus provides a high radix network based on a re-arrangeably non-blocking Clos network.

The design presented illustrates a two-tier folded Clos network. As seen in the configuration 300 of FIG. 3(a), there are effectively two layers of switches: a layer of spine switches and a layer of edge switches. Three of the edge switches, however, can be utilized as egress switches which pass data on to the network. FIG. 3(b) thus illustrates a logical arrangement 350 of the switches, herein referred to as a "deployment unit," showing the three edge switches as egress switches which sit at the "top" of the group of switches and pass data "up and out" of the deployment unit. Each of the twelve spine switches can be thought of as having a port out the logical "back" side to one of the three egress switches, but the three switches are simply one of the twenty-four edge servers illustrated in a folded representation. The egress switches simply have the only connections out of the deployment unit, while the remaining edge switches have connections to underlying devices. All traffic into and out of the deployment unit thus is routed through one of the three egress switches, although different numbers of switches can be used in different embodiments.

Even though the network may appear similar to the traditional core switch-based design of FIG. 2, the spine switches in this design function as core switches, but do not have any outbound connectivity. The layers of the deployment unit have fully meshed connectivity, however, provided by the spine switches. The deployment unit without the egress switches would function as a standalone network without any external connectivity. Thus, some of the edge switches can be utilized as egress switches as illustrated. Otherwise, the fact that some of the edge switches are illustrated on the top layer and some on the bottom layer is meaningless from a network connectivity perspective with respect to the spine switches and the other edge switches, and there is very symmetric behavior. The data within the deployment unit can be pushed through a number of equidistant, fault-tolerant paths, providing the re-arrangably non-blocking behavior. With the paths being symmetric and equidistant, all the switches can follow the same routing protocol and spread the traffic evenly without a lot of overhead or additional logic. Further, the deployment units can be replicated multiple times within a data center, for example, wherein a Clos-style network effectively manages traffic across all of the deployment units in the data center.

An advantage of a high radix network or similar fat tree design is that the network can easily be scaled by adding additional deployment units, each connected using an aggregation fabric such as is described with respect to FIG. 2. A potential downside, however, is that the number of devices needed to scale the deployment units can increase very quickly, which can significantly increase the cost of the network. In an example where large data switches in a network are replaced with a design utilizing commodity switches in a high radix or other such implementation, the number of devices increases from around fifteen switches to on the order of seven hundred to eight hundred switches. Commodity switches as used herein generally refer not only to mass-produced, off-the-shelf switches, but also refer to switches built by low cost Just-In-Time (JIT) or on-demand manufacturers, typically using "merchant silicon" or other relatively low-cost materials. Commodity switches typically are relatively simple, although more complex proprietary switches can be included as well.

Replacing the large switches with a number of smaller commodity switches in this example, however, increases the number of Layer 3 switches that speak the appropriate routing protocol on the order of about fifty times in one embodiment. Further, each of the switches will have to obtain information about all the other switches in the data center, as well as information about all the host devices connected to those switches, such that the amount of information that each switch needs to obtain and process is much higher than in certain conventional designs. Thus, while a high radix interconnection network provides advantages such as ease of scalability and high bandwidth capability, as well as a chance for significant cost savings, the complexity of the routing protocol grows on the order of $n^2$ for a two-tier Clos-based network design, and on the order of $n^4$ for a three-tier Clos-based network, where n is the number of ports on the devices used in each tier. For a large number of hosts, this can provide a significant expenditure and overhead, which can be undesirable in many instances.

Figure 4:
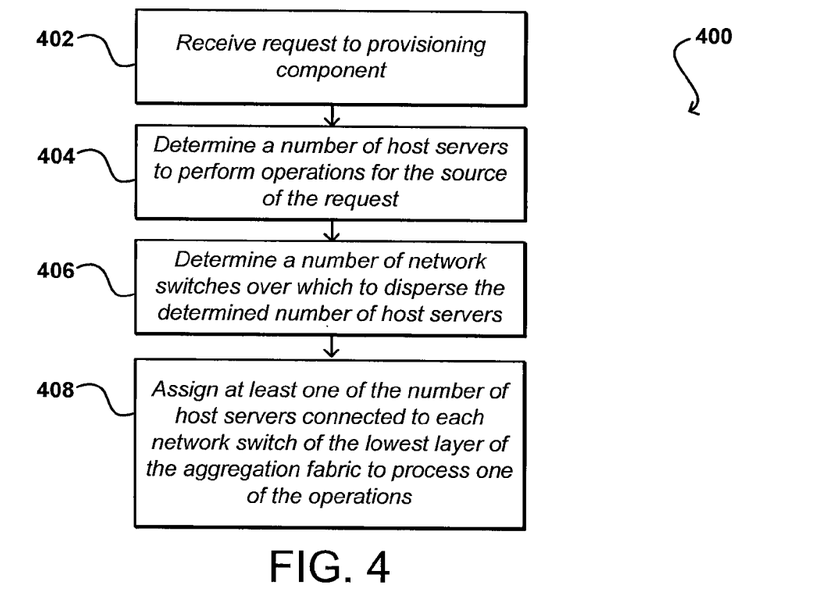
FIG. 4 illustrates an example process for dispersing workload data across network components that can be used in accordance with various embodiments.

FIG. 4 illustrates an example process 400 for managing data using a plurality of network switches and hosts in a networked environment that can be used in accordance with various embodiments. In this example, a request is received to a provisioning component for the networked environment 402. The networked environment in this example includes a plurality of host servers connected by an aggregation fabric including layers of network switches, a path across the aggregation fabric to each host server involving a number of connections across the network switches. A number of the host servers is determined to be included in a group of hosts for performing subsequent operations associated with a source of the request 404, such as a customer of the networked environment. For at least a lowest layer of the aggregation fabric, a number of network switches over which to disperse the group of host servers is determined 406, the number of network switches at the lowest layer being at most equal to the determined number of host servers. At least one of the determined number of host servers connected to each network switch of the lowest layer then can be assigned to process one of the subsequent operations 408. Using such an approach, each of the determined host servers is operable to concurrently perform at least a portion of a subsequent operation for the source.

A trivial form of activity in such a network resulting in packet buffering involves two network flows being directed to a single destination, for embodiments relating to incast functionality. In the common case where all links and/or ports have the same capacity on the transmit (Tx) and receive (Rx) (e.g., 10 GbE), there can be twice as much ingress through the source ports as there is egress out of the destination port. For as long as there is simultaneous traffic, (at least) half the incoming packets will typically need to be buffered based on some fairness or other such criteria. If this period of buffering exceeds the physical capacity of the network device, packets can begin to drop until the source flows are throttled back.

In one example, Quanta LB6 24-port 10G switches have about 1.7 MB of general buffering, which would take about 1400 us to drain through one 10 Gbps egress port. However, streaming workloads which result in that level of buffering against a single egress port tend to be "bandwidth" sensitive rather than "latency" sensitive. In practice, latency sensitive traffic tends to be between multiple sources and destinations, so drains in parallel through many egress ports and TP99+ switch induced latencies are typically orders of magnitude smaller than theoretical maximums. On the Broadcom Trident ASIC, cut-through routing can be as low as 900 ns, while store-and-forward of a 9 KB frame is 10.5 us.

In an N-to-1 embodiment, generalizing the 2-to-1 example above, all of the nodes in a given cluster are communicating with only one node. For example, all of the nodes in a Beowulf-style cluster are communicating with the Head node. Another example is the reduction phase of a Map-Reduce operation, which attempts to use one node to merge the results from all of the nodes of the cluster participating in the Map part of the operation.

In an X-to-1 embodiment, where X refers to the number of flows with a source or destination outside of the task cluster, several network flows communicate with a single node in the task cluster. For long lived flows, this is a common scenario for out-of-cluster persistent storage access, where many storage hosts communicate with a head or storage node coordinating on behalf of the cluster (e.g., file server). A compute instance in a cluster can stripe data across multiple volumes to increase throughput (e.g., like RAID 0). Even with throughput of only 900 Mbps per volume, for example, twelve volumes could overload the 10 Gbps link to a Cluster Compute instance (ignoring any software induced bottlenecks). For short-lived flows, this can be a common scenario for service hosting where several clients are managed by a single job control node. The front end of load balancers may centrally receive incoming requests, subsequently delegating actual processing to other servers.

In cases of incast with the same terminal IP address, packet loss (for Ethernet) generally occurs at the switch connected to the destination host (i.e., when its buffer overflows and packets are "tail dropped" from the buffering queue). Congestion at the Ethernet destination host switch will not generally cause cascading congestion in other switches in the network.

Incast can also occur for any switch which introduces oversubscription on a commonly used route. For N*M well-utilized ingress ports, N:1 oversubscription to M egress ports along the flow path creates a topologically induced constriction. This oversubscription is added as an optimization to reduce the magnitude of capacity between devices where it is not expected to be needed—based on a statistical expectation of the loads on those routes. However, if the statistical model is poorly designed or the load evolves in unexpected ways, incast can result even when the switch is not connected to a flow terminus (e.g., a destination server).

When incast is the result of several long-lived flows (e.g., streaming large data sets) converging on a single destination (e.g., a host or intermediate port in a multi-hop path), TCP is an extremely effective protocol and the exponential back-off control mechanisms are very well suited for throttling the flows. For short bursts that exceed the buffering capabilities of a particular switch (e.g., a TOR switch for a server experiencing incast), TCP can cause extremely inefficient networking behavior: packet loss response is too long, back-off is too aggressive, etc. This is why TCP/IP over Ethernet is often eschewed (in favor of Infiniband, for example) for communication bursts often seen with MPI traffic in HPC task clusters. Regardless of protocol, sustained incast can result in the throttling of N sources each to 1/Nth line rate (assuming equal priority) once buffering capacity on the route to the oversubscribed destination is exceeded.

In other embodiments, such as where replication of messages to multiple egress ports is hardware-assisted in the network devices (i.e. subnet "broadcast" or "multicast"), this can trivially create egress port buffering across several ports even if there is no port-level oversubscription across the device for those routes. In other words, K-way replication inside the device effectively introduces K:1 oversubscription to egress. With shared or global device buffers, this can congest all routes through the device. This is one reason why general purpose and shared networks often turn off hardware-assisted multicast/broadcast, or otherwise limit it to a small fraction of the device capacity. In an already oversubscribed network, such as a typical Aggregation Pair hierarchy for a data center, this hardware-assisted amplification of oversubscription can quickly lead to fabric collapse.

In an N×N embodiment, all nodes within a task cluster communicate with all other nodes concurrently. This is often associated with N-way synchronization of a computational model (e.g., Finite Element Methods). Automatic scale-out infrastructures such as MPI or OpenMP can encourage this usage pattern, partly because of the convenience of using broadcast messaging primitives (e.g., MPI_BCAST). Common scenarios include message passing broadcast, distributed in-cluster file systems, and BitTorrent or similar storage block sharing.

A special case of N×N is where nodes can be divided into two halves (e.g., ½N to ½N). Each node in one half of the cluster transmits to exactly one node in the other half concurrently (i.e. such that each node is also receiving from only one other node). The simplest case is where nodes are simply paired: one node in each pair coming from one half, and one node coming from the other. The nodes then transmit and receive with only each other. This pattern rarely happens explicitly in practice, but may represent a burst or convoying scenario (i.e. rather than one that happens because of long lived flows). It is also the traffic pattern generated for the N×N pattern when doing Ordered Iterative Unicast described elsewhere.

Such a pattern is interesting at least because it stresses the maximum bisection bandwidth of the network which spans the hosts in the group. In an oversubscribed, or even a non-oversubscribed but poorly behaving network, this can encourage packet buffering in higher layers of the network (which are notoriously harder to stress).

In a 1-to-N embodiment, a central "storage" node can provide persistent storage for all compute nodes to initialize a computation; a common case involves downloading all of the model data to each node (e.g., the world model in a distributed ray tracer). A head node can distribute tasks to compute nodes in a Beowulf cluster. In an X-to-N embodiment, on the other hand, load balancing can be performed across several computer nodes and/or task clusters, providing a distributed cluster file system external to the cluster, and distributed services in general. Depending on X and N, X-to-N may behave like 1-to-N' or X'-to-1.

In networks where multicast/broadcast is not hardware assisted, N×N communication can be implemented on each host by iterative unicast to the N−1 other hosts. If all nodes within a cluster are synchronized and enumerate host-to-host unicast in the same order in the cluster, this can create a worst-case behavior of N-to-1 incast for each node in the cluster in order. That is, if at Time t1 all N Hosts attempt to communicate with Host h1, and then during t2 all N Hosts attempt to communicate with h2, etc. This can result in N-to-1 incast at each host in successive order. At any given time, hosts will be forced to transmit at a rate of R/N (where R is the port line rate like 10 Gbps), and only 1 host will be receiving at R while all the other N−1 Hosts are receiving nothing. In other words, each host must transmit its payload for N times as long because incast throttled the rate to 1/Nth the native rate. To completely transmit N messages to other hosts, each host will require $N*T*N=T*N^2$ time. As such, N×N task cluster communication (without hardware assistance for multicast/broadcast) has a degenerate $O(N^2)$ worst case communication time.

One solution to mitigate this phenomenon is to randomize the order in which iterative unicast is performed among participating hosts. Each host randomly selects the next host to send its payload rather than using a commonly ordered list. The level of incast is statistically reduced from the worst case of N-to-1 to P-to-1, where P is the probability of multiple hosts randomly selecting the same destination host during a particular time slice (as known in the art of hash theory). This is referred to herein as "Random Next Iteration". Randomly selecting a receiver host has the luxury of being oblivious, as it does not require information about the behavior of other hosts (or worse, synchronization with them) and can be trivially implemented in a substrate software stack such as an MPI library or networking stack of the host Dom0.

Even though P would generally start small relative to N (e.g., average less than 2), there are challenges with convoying which may cause it to degenerate toward N-to-1 incast or at least to create multiple less-than-N-to-1 incast groups within the task cluster. For example, if even one hosts ends up receiving 2-to-1 incast (which, per the "birthday paradox" known in the art of statistical theory, is likely to happen even when only square root of N hosts are transmitting), the transmitting hosts require at least twice as long to transmit their payloads. During this double length transmit window, many other hosts will likely complete their transmissions to their respective destination hosts (which at full line rate takes half as long). As these hosts move on to their next transmission, some percentage will random select the already incast host as a receiver, further slowing communication to $\frac{1}{3}^{rd}$ or worse.

Such phenomenon is referred to herein as "receiver load accretion." Receiver load accretion can happen simultaneously in several places within the group of N servers, likely tending toward a consistently degraded transmission rate across all N servers depending on the duty cycle and frequency of transmissions. This is classic convoying behavior. Further, task clusters are very likely to have time correlated communication (e.g., synchronizing a Finite Element model between computational iterations), even when their networking duty cycle is extremely low. Therefore, incast is much more likely to happen within a task cluster group than spontaneously between unrelated workloads. That is, uncorrelated loads with relatively low duty cycles are unlikely to use the network at the same time, and this is the basic justification of using oversubscription in networks (as known in the art).

In a Constant Bisectional Bandwidth (CBB) network, such as a Clos or other Fat Tree topology, there is a general, brute force mitigation for degenerative incast, for example as might be caused using Random Next Iteration. Hosts participating in common calculations can be distributed across as many lowest layer switches as possible (ideally N), so that when separate incast groups invariably form at the receiving host ports, they are not likely to be coincident on the same switch. This can maximize the amount of buffering the overall network can devote to concurrent incast events, since each incast event occurs on a different switch. In effect, the aggregate buffers of all of the separate switches help to absorb the burst of packet traffic and ensuing packet buffering, which helps curtail cascading propagation of the incast condition to higher level switches. Reducing packet loss also helps avoid transmission rate throttling at the hosts and other negative behavior (like retry oscillations) that can result as higher level networking protocols like TCP attempt to compensate for packet loss.

Such a "dispersion" technique can help to mitigate any generic traffic patterns between N hosts connected by a CBB network, even if it is not known to be the challenging N×N pattern. In general, for any K×L intense communication pattern, maximal dispersion of the L receivers across a CBB network should help leverage maximal buffering capability of multiple switching devices connected to those receivers. Such approaches can be generalized in many instances to any interconnection technology between computing elements where interconnect hubs can perform buffering (e.g., between processors in a server, between caches, etc).

Figure 5:
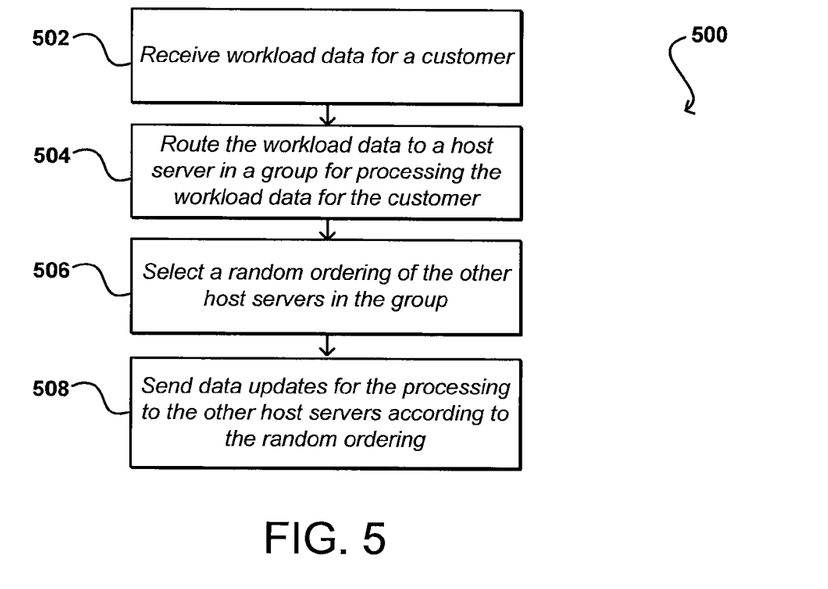
FIG. 5 illustrates an example process for communicating updates among a group of network components according to a random ordering that can be used in accordance with various embodiments.

FIG. 5 illustrates a high level overview of an example process 500 for dispersing workload data that can be used in accordance with various embodiments. In this example, workload data having a specified terminating address is received to one of a group of host servers selected to process a common set of workload data for a customer 502. The group of host servers can be connected by a network aggregation fabric including layers of network switches, with a path across the aggregation fabric to each host server involving a number of connections across the network switches. The group of host servers can be dispersed across a number of network switches for at least a lowest layer of the aggregation fabric. The workload data can be routed to the appropriate host server corresponding to the address, and the workload can be processed by that host server 504. If there are data updates as a result of the processing that need to be propagated to the other host servers in the group, the processing host server can select a random ordering of the other host servers in the group 506. The data updates then can be sent to each of the other host servers according to the random ordering 508. Such an approach enables updates to be periodically shared across all the host servers in the group using separately generated randomized orderings in order to reduce a statistical likelihood of network congestion due to flow convergence or other such issues.

To help avoid degenerative convoying, an approach in accordance with other embodiments can attempt to avoid even probabilistic incast collisions entirely. One such approach is referred to herein as "Ordered Next Iteration." Ordered Next Iteration can involve creating an absolute ordering of all hosts, with each host then iterating through the other hosts starting with the next host in the ordering (wrapping at the edge). For example, h1 transmits to h2 during t1, h2 transmits to h3 during t1, ..., h1 transmits to hN during tN, etc. In other words, h1 iterates the pattern 2, 3, ..., n; h2 iterates the pattern 3, 4, ..., n, 1 and so on. In this way, each host is receiving from and sending to one other host at a time, and at full line rate for both Tx and Rx. Since all hosts are (ideally) transmitting and receiving at full line rate concurrently, the total transmit time is T*N.

This can also be an optimal amount of time required even in the presence of hardware assisted broadcast/multicast, since device replication generally only helps with the transmit side and the hosts must still receive all of the replicated messages, which takes T*N time. Indeed, because of the high likelihood of device congestion with message replication, using a structured Ordered Next Iteration approach may even be less likely to result in dropped packets and concomitant rate oscillations generated by timeout and retry protocols (like those in TCP).

In other words, all hosts in this embodiment get to send to one other host at full rate in parallel rather than send to each host at 1/Nth the rate (for N times as long each). For 10 hosts that would otherwise have a 10% duty cycle on networking, taking 10 times as long to transmit halves overall performance (10*0.1+1*0.9=1.9). Such calculation does not even factor the significant effects of packet loss from incast congestion while protocols adjust. Ordered next iteration can result in some convoying if there are significant enough variations in processing time or intermediate switches experience collisions from uncorrelated workloads. As such, dispersion techniques are still relevant.

Figure 6:
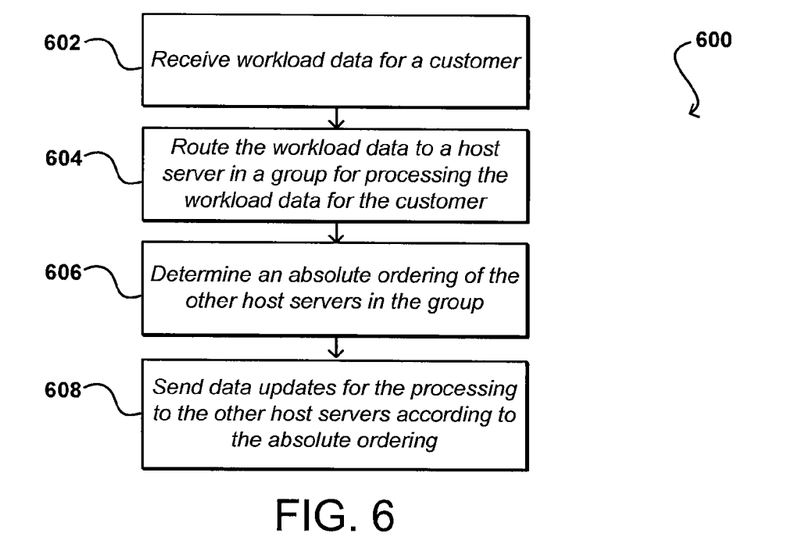
FIG. 6 illustrates an example process for communicating updates among a group of network components according to an absolute ordering that can be used in accordance with various embodiments.

FIG. 6 illustrates a high level overview of an example process 600 for dispersing workload data that can be used in accordance with various embodiments. In this example, workload data having a specified terminating address is received to one of a group of host servers selected to process a common set of workload data for a customer 602. The group of host servers can be connected by a network aggregation fabric including layers of network switches, with a path across the aggregation fabric to each host server involving a number of connections across the network switches. The group of host servers can be dispersed across a number of network switches for at least a lowest layer of the aggregation fabric. The workload data can be routed to the appropriate host server corresponding to the address, and the workload can be processed by that host server 604. If there are data updates as a result of the processing that need to be propagated to the other host servers in the group, the processing host server can determine an absolute ordering of the other host servers in the group 606. As discussed, the absolute ordering can be based upon any appropriate factor, such as IP addresses or port numbers, or can be predetermined in order to statistically minimize a likelihood of network congestion based on known transmission patterns of the workload. A different absolute ordering can be associated with each host server in the group. The data updates then can be sent to each of the other host servers according to the absolute ordering 608.

Various embodiments discussed herein also relate to oversubscribed networks. In a network with oversubscription, bisection bandwidth between groups of hosts may vary depending on factors such as placement. Moreover, the aggregate line rate of participating hosts may exceed the bandwidth of the oversubscribed parts of the network. The network topology may induce intermediate incast conditions where oversubscription is introduced (per "max flow, min cut theorem" as known in the art of network flow theory).

In a layered network, oversubscription is typically introduced for routes from lower layers (where there is more aggregate bandwidth) to upper layers (where there is less). For an S:1 oversubscribed network, bandwidth to the upper layer can be thought of as "S times more valuable" than bandwidth to the lower layers. Therefore, traffic to oversubscribed routes can also be "S times more costly" than traffic routed back down (assuming internally non-oversubscribed switches). Natural extensions apply when the network is not layered, as the traffic expense can be amplified or attenuated according to the subscription rate along the route.

Each hop can also consume "link bandwidth." For example, a route with three hops is intrinsically cheaper than a route with five hops. In a non-oversubscribed network, reducing the number of hops may have minor power advantages but otherwise the network is simply underutilized. In an oversubscribed network, reducing the number hops reduces the amount of traffic in progressively more oversubscribed layers, and thus can provide significant advantages.

In an oversubscribed environment, dispersing workloads across as many switches as possible (e.g., to maximize available buffering) may not be an optimal approach, due to factors such as the bandwidth cost amplification to route traffic through higher layers. Instead, clustering participating hosts to subtend a smaller section of network spanning tree can be used to reduce load on the higher switching layers. In other words, the average aggregate link bandwidth is reduced by using fewer switches that are more closely clustered together within the physical fabric. In an extreme example, all hosts can be connected to a single switch, such that a host would need only one intermediate hop to get to the other hosts. The amount of clustering thus can be a function of factors such as the oversubscription rate of higher layers of the switching topology, the duty cycle of workload communication, the buffering capability of the higher layer switches, etc.

Figure 7:
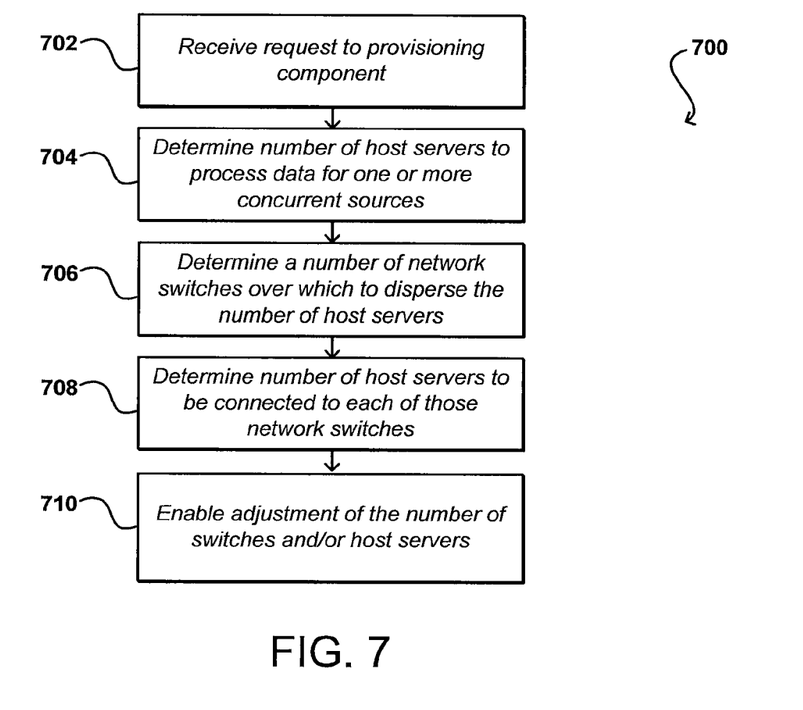
FIG. 7 illustrates an example process for reducing the average link bandwidth in an oversubscribed environment that can be used in accordance with various embodiments.

FIG. 7 illustrates an example process 700 for reducing the average link bandwidth for an oversubscribed environment that can be used in accordance with various embodiments. In this example, a request is received to a provisioning component for the networked environment 702. The networked environment can include a plurality of computing host servers to be connected by a network aggregation fabric including layers of network switches, a path across the aggregation fabric to each host server involving a number of connections across the network switches. At least some level of oversubscription can be present for at least one layer of the aggregation fabric. A number of the host servers to be used in processing data associated with one or more concurrent sources of the request can be determined 704, as well as, for at least a lowest layer of the aggregation fabric, a number of network switches over which to disperse the determined number of host servers 706. A number of the host servers to be connected to each of the network switches at the lowest layer of the aggregation fabric can also be determined 708. Adjustment then can be enabled for the number of network switches over which to disperse the determined number of host servers, as well as the number of host servers to be connected to each of the network switches at the lowest layer of the aggregation fabric 710.

In general, routers with larger buffers can tolerate more traffic, or oversubscription, before dropping packets. Routers which are managing traffic from diverse workloads can also tolerate more traffic since traffic bursts are averaged across the aggregate number of ports. The amount of clustering vs. dispersion is a complex and possibly unpredictable equation, so may advantageously be implemented, in at least some embodiments, as a dynamic adjustment based on measured loads. This may or may not be a "real-time" adjustment; it may simply be historical measurement for a particular customer or set of workloads.

Placement decisions may also be based on aggregate measurements of the overall network load, and not customer specific. The amount of clustering vs. dispersion of a particular customer request can be adjusted based on currently measured buffering queue lengths in devices: the Placement Manager directs the placement of instances based on traffic currently being experienced by the overall network and not specifically based on current or historical specific customer usage patterns. Combinations of these techniques may improve accuracy of placement predictions.

In a cloud setting, for example, a component such as a cloud placement manager can determine which servers will host customer virtual machines or workloads. If the placement manager has no information about communication patterns of the customer, it might be configured to assume that each different customer represents a correlated workload with N×N worst case behavior. In a CBB network, for example, a placement manager can disperse the customer's instances across as many subnets as possible. If the customer provides additional information, such as "placement group" directives for instances, each of these placement groups within the customer's overall usage can be assumed strongly correlated, and the overall customer's use assumed more loosely correlated (but still more correlated than a different customer's usage). Placement thus can be managed accordingly. Automated metrics gathering which observes customer usage patterns can also be used to categorize customer requirements, and more precisely identify hosts which exhibit correlated vs. uncorrelated communication, duty cycle, bandwidth requirements, etc.

Other data from customers, such as communication latency or instance durability (e.g., minimizing correlated failures between instances caused by physical failures like power supply failures), may also help to shape the level of clustering vs. dispersion. These might even apply in a network such as a CBB network, since these considerations are unrelated to the amount of bandwidth available at higher layers of the network.

Figure 8:
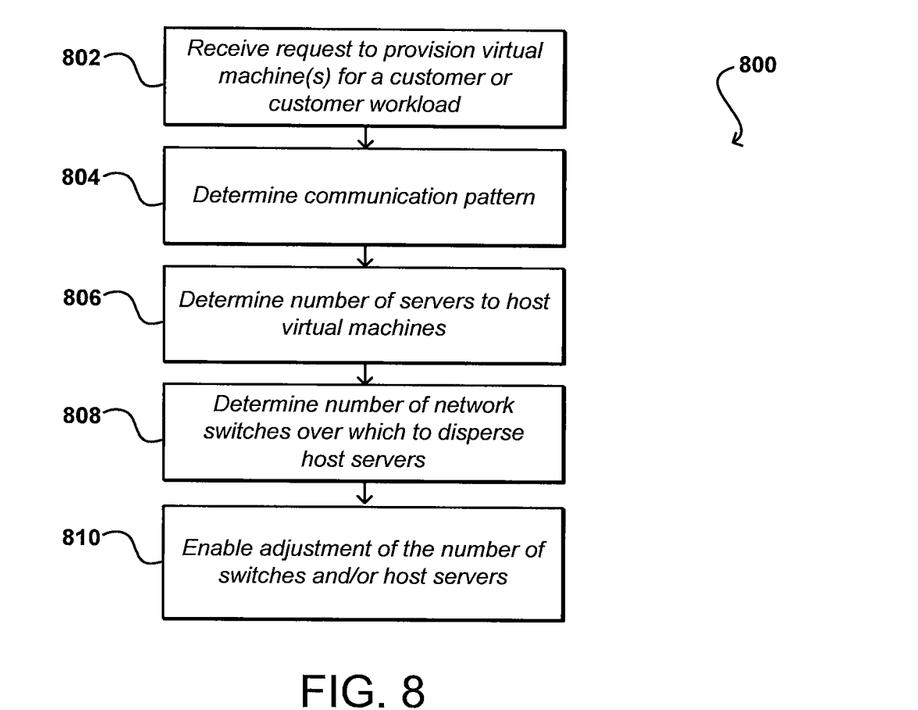
FIG. 8 illustrates an example process for dispersing workload data across network components in a multi-tenant environment that can be used in accordance with various embodiments.

FIG. 8 illustrates an example process 800 for managing data in a multi-tenant environment, such as a network cloud, that can be used in accordance with various embodiments. In this example, a request is received to a placement manager to provision a plurality of virtual machines for at least one of a customer or customer workload in a multi-tenant environment 802. The multi-tenant environment can include a plurality of servers connected by a network aggregation fabric including layers of network switches, each of the plurality of servers operable to host one or more virtual machines for one or more customers. A communication pattern of the customer can be determined 804. Based at least in part upon the determined communication pattern of the customer, a number of servers to host the virtual machines can be determined 806, as well as, for at least a lowest layer of the aggregation fabric, a number of network switches over which to disperse the determined number of servers 808. A level of dispersion of the virtual machines for a customer or customer workload then can be determined and/or adjusted based at least in part upon the communication pattern of the customer 810, which can be monitored over time.

Discussion of Concepts Utilized Herein

In order to further facilitate understanding of the disclosure presented above, the following sections present discussion of specific concepts that can be utilized in accordance with the various embodiments. It should be understood that the discussion of each concept is not comprehensive, such that there may be other aspects covered under a given concept that are not specifically addressed herein.

Statistical Multiplexing:

In the context of packet switching networks, statistical multiplexing refers generally to a design model where packet queues built on finite buffers manage packet traffic between multiple sources and destinations over a fixed number of shared, time-multiplexed communication links. The sizes of the queues and the number and capacity of the links can be determined by a statistical expectation of load patterns anticipated by the multiplexer. As an example, a multiplexer can comprise a hybrid Clos network involving several layers of 24-port 10G Ethernet ASICs, which each have about 2 MiB of buffer for packet queuing.

The concepts used in statistical multiplexing are common in many fields of engineering—all arguably commonly founded in hash theory. For example, processor caches are designed around the concept that only a small percentage of data used in processing is needed at any given time. These "hot data" are made available in a very fast part of the circuit which is "oversubscribed" relative to the total amount of main memory. Caches are time multiplexed, oversubscribed resources since new data is swapped in over time as the computation evolves to need different parts of the data set. This is similar to the way central networking routers are bandwidth oversubscribed to support a large network—at any given time, only a small percentage of the servers in the network need to use the network. Indeed, at the functional component level, cache controllers are very topologically similar to network switches. Extending the comparison deeper, set associativity in caches is much like ECMP in network devices—multiple elements of the resource (cache lines for caches or network ports for switches) can be used to service a particular part of the load concurrently.

Similar concepts are pervasive in even vastly different areas of engineering. For example, the transmission in a typical road car is not designed to handle full engine load for extended periods of time. The assumption is that for short bursts, the engine will be utilized at high load to accelerate and then will settle to relatively low RPM and torque for cruising distances. Race cars have drive trains that are capable of operating continuously at peak engine output, but the cost of design, maintenance and comfort are extremely high, and generally impractical for a road car which has a much more modest duty cycle requirement of the engine.

The "statistical" aspect is that expected load patterns are statistically analyzed to design systems that minimize the amount of resources provided while maximizing the benefit of those resources for the expected use pattern. In large stable systems that have low duty cycle of usage of the common resource, the statistical model can be made quite accurate and can often save a great deal of cost by minimizing the amount of actual resource provided. In some cases, the minimization can improve the overall experience by simplifying the overall system (e.g., fewer network routers must be maintained).

Switch:

A "switch" as used herein is a network device configured to perform tasks such as packet switching, and the term is used generically to refer to network devices performing operations at all hardware-accelerated "layers" of, for example, the OSI model. The present description primarily focuses on relevance to TCP/UDP (Layer 4+) over IP (Layer 3) over Ethernet (Layer 2), but generally applies to other protocols and technologies, such as Infiniband. "Switch" may be used generically to refer to any device commonly called a "router" (Layer 3+), "multi-layer switch" (Layer 2+), or "top-of-rack (TOR) switch" (typically Layer 2 only).

Router:

A "router" as used herein refers generally to a network switch performing routing (Layer 3+). The term "router" is often associated with devices performing "core routing" for a data center in a hierarchical pair networking model, so tends to connote a big/expensive device (e.g., a Cisco Catalyst 6500-series switch) with large buffers relative to aggregate line rate. So called "deep buffers" help to deal with the higher likelihood in a highly oversubscribed network of packet buffering caused by uncorrelated flows resulting in dropped packets (i.e. overflowing the buffers)—per statistical multiplexing theory as known in the art.

Subscription Rate:

"Subscription rate" as used herein refers generally to the ratio of aggregate ingress to egress link bandwidth relative to the implied routing path. In a layered or hierarchical networking model, this often describes the link capacity from the "lower layer" into the "upper layer." When the subscription rate is greater than 1:1, it is called oversubscription and when less than 1:1, it is called undersubscription. For example, a TOR switch in a server rack can have 40×1 GbE connections to host servers and 4×1 GbE "uplinks to core aggregation routers." The over-subscription rate of this TOR switch is 10:1 (i.e., 40:4) for flows destined for "core routing". Note that the same switch is often non-oversubscribed (i.e., 1:1 subscription rate) for flows going from one server connected directly to the switch to another server on the same switch. In other words, it is important to remember that subscription rate is relative to the flow path. Incidentally, internal subscription rate is not always 1:1 either. For example, the original Broadcom LB8 design had 3:2 oversubscription for paths that traversed multiple Trident ASICs and Cisco 6500-series Catalyst routers experience 6:5 oversubscription into the backplane when fully populated with line cards. In some cases, it can vary depending on route even for flows routed strictly within the switch (e.g., LB8 would have been 1:1 for flows routed through one internal ASIC, and 3:2 for paths routed through more than one).

Packet Buffering/Contention:

"Packet buffering" or "packet contention" refer to a general condition where ingress packets are queued because a switch cannot drain packets through egress ports as fast as they are arriving. This is sometimes known as "contention," or when regularly caused by specific egress ports: "port contention." For Ethernet, this can happen even in a "physically non-blocking" network because the protocol does not reserve an end-to-end route before initiating a flow. Devices in a physically non-oversubscribed network such as a Clos topology may still need to buffer multiple packets for a particular egress port while waiting for in-flight packets to drain. When multiple long-lived flows are routed to the same egress port, this can quickly lead to "congestion."

Congestion:

Congestion in the present disclosure refers generally to the condition where network packet buffering effectively exceeds queuing resources on the switch device. For "lossy" protocols like Ethernet, packets that cannot be queued are simply ignored by the congested device. This packet "dropping" is also known as "packet loss;" higher layer protocols (e.g., TCP/IP) must accommodate by noticing and resending dropped data where required. In contrast, Infiniband is a point-to-point switched fabric protocol whose accompanying credit based flow control avoids dropped packets by assuring a route before accepting packet traffic destined for a particular egress port. If an Infiniband switch becomes congested along a particular route, the device will stop granting credits for that flow. This starves the proceeding device in the flow route of credits. If excessive traffic is sustained, this credit starvation will propagate through all of the switches in the flow path back to the source(s), ultimately resulting in queuing on the originating host(s). Because of shared device resources (e.g., global buffers and queues) and flow control priorities, other flows which encounter congested Infiniband switches may also quickly congest switches on their own routes, sometimes resulting in cascading congestion of the entire fabric (a.k.a. "fabric collapse"). As such, Infiniband is often deployed as a non-oversubscribed or only lightly oversubscribed (e.g., 2:1) fabric to avoid egress contention. Intel's Quick Path Interconnect (QPI) which connects integrated circuits (e.g., CPUs, I/O Hubs) in computing servers uses a similar packet switched, credit based fabric and similar design considerations prevail.

Network Fabric Collapse:

"Network Fabric Collapse" refers generally to a condition where the majority of devices serving network traffic become congested and packet delivery for all servers and/or endpoints in the network become severely delayed or indefinitely stopped. This notoriously can happen with lossless fabrics (e.g., Infiniband) in the presence of network oversubscription, but similar phenomena can occur with lossy protocols like Ethernet depending on device configuration choices around buffer/queue sharing, expired/unconfirmed forwarding routes, etc. Unusually poor network performance (i.e., low bandwidth, high latency or packet loss, combinations thereof) often exposes shortcomings of higher layer protocols or application software. Common failures include: network timeouts from seriously delayed flows resulting in services crashing, packet delivery delays resulting in application-level timeouts and rapid retry behavior that actually increases network demands (particularly for protocols like UDP which do not by default use exponential backoff on packet/retry rate like TCP). Fabric collapse of a large scale network supporting extremely large distributed systems (e.g., Amazon.com) can sometimes take hours to decongest, and often requires extensive human intervention.

Convoying:

Packet buffering can lead to "convoying" behavior, which as used herein refers generally to a condition where generally independent communication flows become implicitly synchronized by arriving at a switch within the same buffering window. This will be particularly pronounced if the flows get routed to the same egress port. In the simple case of two coincident flows, each flow has a tendency to queue up in the switch buffers and drain more or less simultaneously once the packet rate falls off (either because the communication burst is short, or because of rate throttling). This statistical multiplexing phenomenon is familiar to computer scientists from hash table theory, where collision resolution using linear probing will create clumps of sequential hash table entries within a hash table. The increasing window of sequentially occupied entries increases the likelihood of subsequent hashes colliding with it. Naively, using relatively small buffers on devices would seem to help avoid convoying by forcing a very small window of opportunity for time based collisions. Unfortunately, network protocol reactions to packet loss such as TCP's retry and exponential back-off tend to exacerbate synchronization, so small buffers don't necessarily help this particular issue (and hurt elsewhere).

Cut-Through Switching:

The process of "cut-through switching" involves routing packets from ingress to egress within the switch as soon as sufficient routing headers have been received to determine the egress port, and beginning retransmission of the packet at egress without waiting for the rest of the packet to arrive. This is primarily in contrast to "store and forward" switching, where the entire packet is received and queued within the device before retransmitting. Routing through a device can happen after a small fixed number of routing header bytes have arrived at ingress, so a cut-through switch behaves like a "bump-in-wire" delay—the delay is independent of the size of the packets being routed (a.k.a. "size invariant latency"). On 10 GbE devices (circa 2010), this can be as little as 200 ns vs. 10.5 us for a 9 KB Jumbo Ethernet frame to be completely received before transmitting at egress. For a network fabric where there can be several hops between servers, a cut-through fabric allows a destination server to be receiving a packet before the source server has completely finished sending the packet. For a store-and-forward based network, the packet latency is the aggregate transceive latency of each hop in the network (e.g., in a 5-hop route across LB6 devices configured as store-and-forward, a 9 KB packet requires at least 5×10.5=52.5 microseconds to propagate, assuming no packet buffering besides the store and forward).

Task Cluster:

A "Task Cluster" as used herein refers to a group of computing hosts participating in a tightly coupled common calculation requiring very high duty cycle communication between hosts. The first modern task cluster was arguably the original NASA Beowulf Cluster in 1993, a sixteen node installation with single core/single threaded processors connected to a non-oversubscribed switching infrastructure. As of 2010, task clusters typically use no more than 32 hosts or 128 cores/threads, where 8-16 dual-processor, quad-core servers represent the bulk of this kind of computing. Software stacks utilizing task clusters evolve slowly and do not necessarily keep up with density improvements in hardware. Indeed, when the number of hardware threads per processor doubles (approximately every 18 months according to Moore's Law), the number of hosts used often drops to half until HPC codes can be refreshed to take advantage of the greater density. Task clusters rarely exceed the number of hosts that can be housed in a single physical rack, probably because low-latency, non-blocking networking requirements are most easily/cheaply achieved by connecting all hosts to the same physical L2 switch using direct attached copper connections. Even in the most extreme cases of supercomputing clusters, the number of hosts in a task cluster (a.k.a. "connected unit", "scalable unit") is typically less than 252 hosts, often within the same/24 subnet (252 and not 256 since some of the IP addresses are reserved for broadcast, gateway, etc).

Super-Cluster:

A group of task clusters participating in a single large distributed calculation is sometimes called a "super-cluster."

There are two main ways of dividing calculations across multiple task clusters: run parallel symmetric computations on different subsets of the data or run different stages of a computation in a pipeline. Parallel computations usually involve some kind of data set chunking and fan out at the beginning and merging of results at the end. Pipelined computations often result in single-producer-consumer dependencies between stages. These different strategies can be used in combination—for example, a given stage of a pipeline may involve several task clusters operating on the data in parallel. These concepts are quite common in scale-out paradigms like "Map-Reduce" and derivative software stacks like Hadoop.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing traffic in a networked environment, comprising:

under control of one or more computer systems configured with executable instructions, receiving a request to a provisioning component for the networked environment, the networked environment including a plurality of host servers connected by an aggregation fabric including layers of network switches, a path across the aggregation fabric to each host server involving a number of connections across the network switches;

determining a number of the host servers to be used in performing subsequent operations associated with a source of the request;

determining a level of subscription for at least a lowest layer of the aggregation fabric;

determining, for at least the lowest layer of the aggregation fabric, a number of network switches over which to disperse the determined number of host servers, the number of network switches being based at least in part on (i) the level of subscription for at least the lowest layer of the aggregation fabric and (ii) a topology of links associated with the aggregation fabric, the number of network switches at the lowest layer being at most equal to the determined number of host servers; and in response to receiving one of the subsequent operations for processing, assigning a subset of the determined number of host servers to process the received subsequent operation, wherein each of the determined host servers in the subset is operable to concurrently perform at least a portion of the received subsequent operation.

2. The computer-implemented method of claim 1, wherein the aggregation fabric is in one of an oversubscribed or non-oversubscribed state.

3. The computer-implemented method of claim 1, wherein the number of network switches over which to disperse the determined number of host servers is determined based at least in part upon a topology and subscription rate of links within the aggregation fabric.

4. The computer-implemented method of claim 1, wherein the number of network switches over which to disperse the determined number of host servers is determined based at least in part upon at least one of historical usage, a current usage, duty cycle, a time of day, or a day of a week.

5. The computer-implemented method of claim 1, wherein a plurality of host servers are operable to be connected to a single network switch or application-specific integrated circuit (ASIC) depending at least in part upon a subscription rate of the aggregation fabric.

6. The computer-implemented method of claim 5, wherein each network switch connected to a set of host servers is a top of rack (TOR) switch connected to a plurality of host devices in a server rack.

7. The computer-implemented method of claim 6, wherein multiple operations are capable of being assigned to the plurality of host servers in each server rack.

8. The computer-implemented method of claim 1, wherein a number of assigned host servers for an operation at a first network switch in the lowest layer is different than a number of assigned host servers for the operation at a second network switch in the lowest layer.

9. The computer-implemented method of claim 1, wherein the aggregation fabric connecting the plurality of host servers to an external network is a high radix interconnection network.

10. The computer-implemented method of claim 1, wherein at least one cluster of network switches for performing an operation is a network with re-arrangeably non-blocking bandwidth.

11. The computer-implemented method of claim 10, wherein at least one cluster of network switches for performing an operation is a Clos topology network.

12. The computer-implemented method of claim 1, wherein at least one cluster of network switches utilizes a network topology selected from a hierarchal router pair or an irregular ad hoc network topology.

13. A computer-implemented method of dispersing host machines for a customer in a data center, comprising:
  under control of one or more computer systems configured with executable instructions,
    receiving a request to provision a specified number of host servers for a customer, the host servers each being connected to one of a plurality of host server-connected switches of an aggregation network fabric comprising a plurality of network switches;
    determining a level of subscription for at least a lowest layer of the aggregation network fabric;
    determining a number of host server-connected switches over which to disperse the specified number of host servers, the number of host server-connected switches being based at least in part on the level of subscription and network topology for at least a lowest layer of the aggregation fabric; and
    in response to receiving an operation for the customer, provisioning a subset of the specified number of host servers across the determined number of host server-connected switches to process the received operation for the customer,
    wherein the received operation for the customer can be performed in parallel using the provisioned subset of host servers in the data center.

14. The computer-implemented method of claim 13, wherein the host servers communicate using conventional network communication protocols.

15. The computer-implemented method of claim 13, wherein the data center is connected using a high redix network.

16. The computer-implemented method of claim 13, wherein the network is a network with re-arrangeably non-blocking bandwidth.

17. The computer-implemented method of claim 16, wherein the network is a Clos topology network.

18. The computer-implemented method of claim 13, wherein the network is a hierarchical router pair network.

19. The computer-implemented method of claim 13, wherein each host server-connected switch is a commodity top of rack (TOR) switch.

20. The computer-implemented method of claim 13, wherein the host servers communicate during a computation process using at least one application programming interface (API).

21. The computer-implemented method of claim 20, wherein the at least one API is implemented in at least one of a message passing interface (MPI) or an open message passing (OpenMP) interface.

22. The computer-implemented method of claim 13, wherein the host servers are further distributed across a plurality of sub-networks.

23. A system for managing data in a networked environment, comprising:
  a hardware processor; and
  memory including instructions that, when executed by the processor, cause the system to: receive a request to a provisioning component for the networked environment, the networked environment including a plurality of host servers connected by an aggregation fabric including layers of network switches, a path across the aggregation fabric to each host server involving a common number of connections across the network switches;
  determine a number of the host servers to be used in performing subsequent operations associated with a source of the request;
  determine a level of subscription for at least a lowest layer of the aggregation fabric;
  determine, for at least a lowest layer of the aggregation fabric, a number of network switches over which to disperse the determined number of host servers, the number of network switches being based at least in part on (i) the level of subscription for at least the lowest layer of the aggregation fabric and (ii) a topology of links associated with the aggregation fabric, the number of network switches at the lowest layer being at most equal to the determined number of host servers; and
  in response to receiving one of the subsequent operations for processing, assign a subset of the determined number of host servers to process the received subsequent operation, wherein each of the determined host servers in the subset is operable to concurrently perform at least a portion of the received subsequent operation.

24. The system of claim 23, wherein the number of network switches over which to disperse the determined number of host servers is determined based at least in part upon a topology and subscription rate of links within the aggregation fabric.

25. The system of claim 23, wherein the number of network switches over which to disperse the determined number of host servers is determined based at least in part upon at least on of historical usage, a current usage, duty cycle, a time of day, or a day of the week.

* * * * *